(12) United States Patent
Zhang et al.

(10) Patent No.: US 12,361,605 B2
(45) Date of Patent: Jul. 15, 2025

(54) PERSPECTIVE METHOD FOR PHYSICAL WHITEBOARD AND GENERATION METHOD FOR VIRTUAL WHITEBOARD

(71) Applicant: YEALINK (XIAMEN) NETWORK TECHNOLOGY CO., LTD., Fujian (CN)

(72) Inventors: Xiaoshuai Zhang, Fujian (CN); Haochen Ye, Fujian (CN)

(73) Assignee: YEALINK (XIAMEN) NETWORK TECHNOLOGY CO., LTD., Xiamen (CN)

( * ) Notice: Subject to any disclaimer, the term of this patent is extended or adjusted under 35 U.S.C. 154(b) by 384 days.

(21) Appl. No.: 18/171,371

(22) Filed: Feb. 19, 2023

(65) Prior Publication Data
US 2023/0290019 A1 Sep. 14, 2023

(30) Foreign Application Priority Data
Mar. 14, 2022 (CN) .......................... 202210249619.0

(51) Int. Cl.
G06T 7/136 (2017.01)
G06T 3/04 (2024.01)
(Continued)

(52) U.S. Cl.
CPC ............. *G06T 11/001* (2013.01); *G06T 3/04* (2024.01); *G06T 5/50* (2013.01); *G06T 7/12* (2017.01);
(Continued)

(58) Field of Classification Search
CPC . G06T 11/001; G06T 3/04; G06T 5/50; G06T 7/12; G06T 7/136; G06T 7/194; G06T 7/20; G06T 2207/10024; G06T 2207/20021; G06T 2207/20032; G06T 2207/20221; G06T 2211/00; G06T 5/94; G06T 3/02; G06T 2207/10016; G06T 2207/10152; G06T 2207/20061; G06T 2207/20132; G06T 7/254; G06T 7/90;
(Continued)

(56) References Cited

U.S. PATENT DOCUMENTS

2004/0165786 A1* 8/2004 Zhang ........................ G06T 7/12
382/276
2005/0104864 A1* 5/2005 Zhang ................ G06V 30/1423
345/173
(Continued)

Primary Examiner — Jitesh Patel

(57) ABSTRACT

Disclosed are a perspective method for a physical whiteboard and a generation method for a virtual whiteboard. A Hoffman straight-line detection method is used, statistics are taken on a quantity of overlapping times of a straight line, and a determining dimension of a whiteboard-related straight line is increased. On a basis of generating a high-precision virtual whiteboard, purity of a whiteboard color is improved through color enhancement, and a virtual whiteboard corresponding to each frame of a physical whiteboard image is processed based on a preset algorithm to obtain a background-color image, a motion map, and a chromatic aberration map, so as to obtain a foreground mask. A character is perspective and smoothed based on a foreground mask of a current frame, a color-enhanced image of the current frame, and a fully perspective image of a previous frame.

11 Claims, 6 Drawing Sheets

(51) Int. Cl.
*G06T 5/50* (2006.01)
*G06T 7/12* (2017.01)
*G06T 7/194* (2017.01)
*G06T 7/20* (2017.01)
*G06T 11/00* (2006.01)

(52) U.S. Cl.
CPC .............. *G06T 7/136* (2017.01); *G06T 7/194* (2017.01); *G06T 7/20* (2013.01); *G06T 2207/10024* (2013.01); *G06T 2207/20021* (2013.01); *G06T 2207/20032* (2013.01); *G06T 2207/20221* (2013.01); *G06T 2211/00* (2013.01)

(58) Field of Classification Search
CPC .. G06T 5/30; G06T 7/13; G06T 7/248; G06T 5/90; G06T 5/70
See application file for complete search history.

(56) References Cited

U.S. PATENT DOCUMENTS

| | | | |
|---|---|---|---|
| 2009/0154807 A1* | 6/2009 | Rossato | G06T 7/155 382/199 |
| 2009/0309956 A1* | 12/2009 | Hawkins | H04M 3/56 348/E7.083 |
| 2013/0039409 A1* | 2/2013 | Gupta | G06V 10/25 375/E7.126 |
| 2014/0105563 A1* | 4/2014 | Voorhees | G09B 21/003 386/224 |
| 2015/0341604 A1* | 11/2015 | Cote | H04N 25/133 348/242 |
| 2018/0268864 A1* | 9/2018 | Bovik | G06T 7/12 |
| 2019/0037171 A1* | 1/2019 | Nagpal | H04N 7/147 |
| 2020/0219314 A1* | 7/2020 | James | G06F 3/04815 |
| 2020/0364463 A1* | 11/2020 | Pooja | G06V 20/47 |
| 2021/0056251 A1* | 2/2021 | Parmar | G06F 3/04847 |
| 2021/0264147 A1* | 8/2021 | Kadambi | G06V 10/60 |

* cited by examiner

PERSPECTIVE METHOD FOR PHYSICAL WHITEBOARD AND GENERATION METHOD FOR VIRTUAL WHITEBOARD

CROSS-REFERENCE TO RELATED APPLICATIONS

The present application claims the benefit of Chinese Patent Application No. 202210249619.0 filed on Mar. 14, 2022, the contents of which are hereby incorporated by reference.

TECHNICAL FIELD

The present disclosure relates to the field of image recognition, and in particular, to a perspective method for a physical whiteboard and a generation method for a virtual whiteboard.

BACKGROUND

In a whiteboard detection and perspective method in existing technical solutions, an image is acquired by a camera, edge information of a whiteboard is extracted based on the image to locate a specific position of the whiteboard, and a whiteboard image is corrected by performing affine transformation on the whiteboard; then, foreground and background detection is performed based on color information of adjacent frames, and a multi-frame fusion strategy is adopted to obtain a perspective character and purify a whiteboard color.

However, the prior art has following disadvantages: A dense color block in the whiteboard is unstable and constantly changes. When there are too many lines in a physical whiteboard, the whiteboard is prone to false corner detection, which makes it impossible to carry out correct affine transformation for the whiteboard. Whiteboard detection and perspective are generally time-consuming and have a high requirement for hardware performance.

Therefore, there is an urgent need for a whiteboard perspective strategy to resolve existing problems of low efficiency and high costs of whiteboard perspective.

SUMMARY

Embodiments of the present disclosure provide a perspective method for a physical whiteboard and a generation method for a virtual whiteboard, so as to improve efficiency of whiteboard perspective.

To resolve the foregoing problems, an embodiment of the present disclosure provides a perspective method for a physical whiteboard, including:
  obtaining virtual whiteboards of a plurality of frames of a physical whiteboard image, and performing preset color enhancement on a virtual whiteboard of each of the frames of the physical whiteboard image to obtain each frame of an enhanced image of the virtual whiteboard;
  obtaining, in each frame of the enhanced image of the virtual whiteboard, a motion map for each of the frames of the physical whiteboard image by a preset weighting algorithm based on a current frame of the enhanced image of the virtual whiteboard and a previous frame of the enhanced image of the virtual whiteboard, and a chromatic aberration map for each of the frames of the physical whiteboard image by the preset weighting algorithm based on the current frame of the enhanced image of the virtual whiteboard and a first frame of a background-color image of the virtual whiteboard, wherein the first frame of the background-color image of the virtual whiteboard is obtained by extracting a background-color image of a virtual whiteboard of a first frame of the physical whiteboard image based on a preset algorithm;
  generating a foreground mask of each of the frames of the physical whiteboard image by median filtering and dilation algorithms based on the motion map and the chromatic aberration map; and
  performing weighted fusion by a preset coefficient based on a foreground mask of a current frame of the physical whiteboard image, the current frame of the enhanced image of the virtual whiteboard, and a fully perspective image of a previous frame of the physical whiteboard image, to obtain a semi-perspective image of the current frame of the physical whiteboard image.

It can be seen from the above that the present disclosure has following beneficial effects: On a basis of generating a high-precision virtual whiteboard, purity of a whiteboard color is improved through the color enhancement, and the virtual whiteboard corresponding to each frame of the physical whiteboard image is processed based on the preset algorithm to obtain the background-color image, the motion map, and the chromatic aberration map, so as to obtain the foreground mask. A character is perspective and smoothed based on the foreground mask of the current frame, the color-enhanced image of the current frame, and the fully perspective image of the previous frame. The present disclosure not only reduces computational complexity of a whiteboard perspective algorithm, but also improves accuracy of detection and perspective, thereby enabling a user to obtain a better experience.

As an improvement of the above solution, a specific procedure of obtaining the first frame of the background-color image of the virtual whiteboard is as follows: using a sliding window with a preset size to divide a Y component of the virtual whiteboard of the first frame of the physical whiteboard image into a plurality of blocks based on the virtual whiteboard of each of the frames of the physical whiteboard image; and performing maximum-heap sorting on the blocks, extracting a mean value of Y component values corresponding to sorted blocks in a preset range, and obtaining the first frame of the background-color image of the virtual whiteboard. A local maximum mean value based on the sliding window is used to improve efficiency of extracting a background color of a whiteboard, so as to obtain a high-quality background color of the whiteboard.

As an improvement of the above solution, the obtaining virtual whiteboards of a plurality of frames of a physical whiteboard image, and performing preset color enhancement on a virtual whiteboard of each of the frames of the physical whiteboard image to obtain each frame of an enhanced image of the virtual whiteboard specifically includes: extracting a background color of each of the frames of the physical whiteboard image based on the virtual whiteboard of each of the frames of the physical whiteboard image, and obtaining an initial pixel of each point in each of the frames of the physical whiteboard image; and performing color enhancement on the initial pixel of each point in each of the frames of the physical whiteboard image based on a preset pixel activation function. After a background-color image of the whiteboard is extracted, the color enhancement is performed by the preset pixel activation function, which improves purity of the background-color image and improves efficiency of image fusion.

As an improvement of the above solution, the obtaining, in each frame of the enhanced image of the virtual whiteboard, a motion map for each of the frames of the physical whiteboard image by a preset weighting algorithm based on a current frame of the enhanced image of the virtual whiteboard and a previous frame of the enhanced image of the virtual whiteboard, and a chromatic aberration map for each of the frames of the physical whiteboard image by the preset weighting algorithm based on the current frame of the enhanced image of the virtual whiteboard and a first frame of a background-color image of the virtual whiteboard specifically includes:

reducing each frame of the enhanced image to a quarter of a size of an original image, directly obtaining a difference between a reduced current frame of the enhanced image of the virtual whiteboard and a reduced previous frame of the enhanced image of the virtual whiteboard, and then performing weighted summation to obtain an absolute value, where a value of a corresponding position of the motion map is increased by 1 when a pixel motion change is greater than a motion threshold, or is cleared when a pixel motion change is not greater than a motion threshold, and a formula is as follows:

$$D_{small}(x) = \begin{cases} D_{small}(x) + 1, & W_{YUV}|C_{small}(x) - P_{small}(x)| > D_{thresh} \\ 0, & \text{else} \end{cases}$$

where $C_{small}(x)$ represents a YUV vector of the reduced current frame of the enhanced image of the virtual whiteboard, $P_{small}(x)$ represents a YUV vector of the reduced previous frame of the enhanced image of the virtual whiteboard, $W_{YUV}$ represents a weight of a YUV component, and $D_{thresh}$ represents the motion threshold; and obtaining a difference between the reduced current frame of the enhanced image of the virtual whiteboard and a reduced first frame of the background-color image of the virtual whiteboard, and then performing weighted summation to obtain an absolute value, where a value of a corresponding position of the chromatic aberration map is 0 when a chroma change is greater than a chromatic aberration threshold, or 1 when a chroma change is not greater than a chromatic aberration threshold, and a formula is as follows:

$$H_{small}(x) = \begin{cases} 0, & W'_{YUV}|C_{small}(x) - W_{small}(x)| > H_{thresh} \\ 1, & \text{else} \end{cases}$$

where $C_{small}(x)$ represent the YUV vector of the reduced current frame of the enhanced image of the virtual whiteboard, $W_{small}(x)$ represents a YUV vector of the reduced first frame of the background-color image of the virtual whiteboard, $W'_{YUV}$ represents a weight of the YUV component, and $H_{thresh}$ represents the chromatic aberration threshold.

The foreground mask is generated for the current frame of enhanced image of the virtual whiteboard, the previous frame of the enhanced image of the virtual whiteboard, and the first frame of the background-color image of the virtual whiteboard, so as to improve accuracy of whiteboard perspective and lay a solid foundation for a subsequent perspective step.

As an improvement of the above solution, the performing weighted fusion by a preset coefficient based on a foreground mask of a current frame of the physical whiteboard image, the current frame of the enhanced image of the virtual whiteboard, and a fully perspective image of a previous frame of the physical whiteboard image, to obtain a semi-perspective image of the current frame of the physical whiteboard image specifically includes: performing image fusion by the preset coefficient based on the foreground mask of the current frame of the physical whiteboard image, the current frame of the enhanced image of the virtual whiteboard, and the fully perspective image of the previous frame of the physical whiteboard image, to obtain a current frame of a fully perspective image of a physical whiteboard, where a formula is as follows:

$$B(x) = \begin{cases} A(x), & M(x) = 1 \\ \beta A(x) + (1 - \beta)C(x), & M(x) = 0 \end{cases}$$

where B(x) represents the current frame of the fully perspective image of the physical whiteboard, A(x) represents a previous frame of the fully perspective image of the physical whiteboard, C(x) represents the current frame of the enhanced image of the virtual whiteboard, and M(x) represents the foreground mask of the current frame of the physical whiteboard image; and performing secondary image fusion by the preset coefficient based on the current frame of the fully perspective image of the physical whiteboard and the current frame of the enhanced image of the virtual whiteboard, to obtain the semi-perspective image of the current frame of the physical whiteboard image, where a formula is as follows:

$$R(x) = \begin{cases} \gamma B(x) + (1 - \gamma)C(x), & M(x) = 1 \\ \delta B(x) + (1 - \delta)C(x), & M(x) = 0 \end{cases}$$

where B(x) represents the current frame of the fully perspective image of the physical whiteboard, C(x) represents the current frame of the enhanced image of the virtual whiteboard, and R(x) represents a current frame of a semi-perspective image of the physical whiteboard. In combination with the chromatic aberration map, the motion map, and the foreground mask, a foreground detection rule and a map layer fusion scheme in the whiteboard are optimized by fusing the fully perspective image and the semi-perspective image, such that a finally processed whiteboard image is smoother, and a more beautiful perspective function is realized.

Correspondingly, the present disclosure further provides a generation method for a virtual whiteboard, including:

obtaining a first frame of a physical whiteboard image, and extracting an edge point set of the first frame of the physical whiteboard image;

mapping the edge point set onto a first straight-line set based on a preset Hoffman straight-line detection algorithm, and calculating a quantity of intersection point overlapping times of each straight line in the first straight-line set to obtain an effective straight-line set of the first frame of the physical whiteboard image, where a quantity of intersection point overlapping times of a straight line in the effective straight-line set is greater than a filtering threshold;

performing combination based on the effective straight-line set of the first frame of the physical whiteboard image to obtain a whiteboard region of the first frame of the physical whiteboard image;

performing homography transformation on the whiteboard region to obtain a virtual whiteboard of the first frame of the physical whiteboard image; and determining virtual whiteboards of other frames of the physical whiteboard image based on the virtual whiteboard of the first frame of the physical whiteboard image, so as to apply the perspective method for a physical whiteboard in the present disclosure to perform whiteboard perspective on virtual whiteboards of all frames of the physical whiteboard image.

It can be seen from the above that the present disclosure has following beneficial effects: The present disclosure uses the Hoffman straight-line detection algorithm, takes statistics on the quantity of overlapping times of the straight line, and increases a determining dimension of a whiteboard-related straight line, which improves extraction accuracy of the straight line, thereby improving accuracy of obtaining the virtual whiteboard and better identifying a whiteboard position. In addition, compared with the prior art, the present disclosure detects a whiteboard, such that computational complexity of generating the virtual whiteboard is also reduced.

As an improvement of the above solution, the mapping the edge point set onto a first straight-line set based on a preset Hoffman straight-line detection algorithm, and calculating a quantity of intersection point overlapping times of each straight line in the first straight-line set to obtain an effective straight-line set of the first frame of the physical whiteboard image specifically includes: constructing Hoffman space, and mapping the edge point set N onto a plurality of straight lines $N_{H1}$, $N_{H2}$, ..., and $N_{Hn}$, where a function expression of each of the straight lines is $\rho = \rho_i \cos(\theta + \varphi_i)$, and $\theta \in [0°, 360°]$, such that the first straight-line set of the first frame of the physical whiteboard image is obtained; calculating intersection point coordinates of the first straight-line set based on a preset overlapping resolution value, and obtaining a quantity of overlapping times of each intersection point; and in the first frame of the physical whiteboard image, mapping an effective intersection point onto an effective straight line in Euler space to obtain the effective straight-line set, where the effective intersection point is an intersection point whose overlapping times are greater than an overlapping threshold. The Hoffman straight-line detection algorithm is used to perform overlapping detection on a straight line onto which each edge point is mapped. When the overlapping resolution value is set, the intersection point whose overlapping times are greater than the overlapping threshold is mapped onto the effective straight line in the Euler space, which ensures extraction of a high-quality straight line in an image and improves straight-line extraction accuracy and efficiency of the whiteboard.

As an improvement of the above solution, before the performing combination to obtain a whiteboard region of the first frame of the physical whiteboard image, the generation method further includes: filtering a straight line with a small quantity of overlapping times and a wrong angle in the effective straight-line set by a preset filtering algorithm based on a quantity of overlapping times of an overlapping straight line in the effective straight-line set, to obtain a whiteboard straight-line set of the first frame of the physical whiteboard image. In combination with the preset filtering algorithm, a large number of falsely detected straight lines of the whiteboard are filtered based on the reserved quantity of overlapping times, which further improves the straight-line extraction accuracy of the whiteboard when a floor boundary and a wall boundary are contained.

As an improvement of the above solution, the performing combination to obtain a whiteboard region of the first frame of the physical whiteboard image specifically includes: performing combination based on the whiteboard straight-line set to obtain a set of effective quadrilaterals of the first frame of the physical whiteboard image, where the effective quadrilateral is a quadrilateral whose area is larger than a preset area; and taking statistics on a quantity of overlapping times of a quadrilateral in the set of effective quadrilaterals, and selecting, as the whiteboard region of the first frame of the physical whiteboard image, a region represented by a quadrilateral with most overlapping times. On a basis of extracting the high-quality straight line, the whiteboard region of the physical whiteboard image is obtained by determining the quantity of overlapping times of the quadrilateral. Based on the determining of the overlapping threshold, accuracy of determining the whiteboard region is improved.

As an improvement of the above solution, the performing homography transformation on the whiteboard region to obtain a virtual whiteboard of the first frame of the physical whiteboard image specifically includes: calculating four corners of the whiteboard region, and calculating four coordinate points of the whiteboard region based on a camera model and a focal length of a camera; and performing, in combination with memory optimization and assembly optimization, high-performance homography transformation in YUV space based on the four corners of the whiteboard region and the four coordinate points of the whiteboard region, so as to obtain a virtual whiteboard of each frame of the physical whiteboard image. The corners and the coordinate points are calculated, which improves efficiency of the homography transformation on a basis of the memory optimization and the assembly optimization, so as to obtain the virtual whiteboard faster.

Correspondingly, the present disclosure further provides a perspective apparatus for a physical whiteboard, including an image enhancement module, a fusion module, a foreground mask module, and a perspective module, where the image enhancement module is configured to obtain virtual whiteboards of a plurality of frames of a physical whiteboard image, and perform preset color enhancement on a virtual whiteboard of each of the frames of the physical whiteboard image to obtain each frame of an enhanced image of the virtual whiteboard;

the fusion module is configured to obtain, in each frame of the enhanced image of the virtual whiteboard, a motion map for each of the frames of the physical whiteboard image by a preset weighting algorithm based on a current frame of the enhanced image of the virtual whiteboard and a previous frame of the enhanced image of the virtual whiteboard, and a chromatic aberration map for each of the frames of the physical whiteboard image by the preset weighting algorithm based on the current frame of the enhanced image of the virtual whiteboard and a first frame of a background-color image of the virtual whiteboard, where the first frame of the background-color image of the virtual whiteboard is obtained by extracting a background-color image of a virtual whiteboard of a first frame of the physical whiteboard image based on a preset algorithm;

the foreground mask module is configured to generate a foreground mask of each of the frames of the physical whiteboard image by median filtering and dilation algorithms based on the motion map and the chromatic aberration map; and the perspective module is configured to perform weighted fusion by a preset coefficient based on a foreground mask of a current frame of the physical whiteboard image, the current frame of the enhanced image of the virtual whiteboard, and a fully perspective image of a previous frame of the physical whiteboard image, to obtain a semi-perspective image of the current frame of the physical whiteboard image.

As an improvement of the above solution, a specific procedure of obtaining the first frame of the background-color image of the virtual whiteboard is as follows: using a sliding window with a preset size to divide a Y component of the virtual whiteboard of the first frame of the physical whiteboard image into a plurality of blocks based on the virtual whiteboard of each of the frames of the physical whiteboard image; and performing maximum-heap sorting on the blocks, extracting a mean value of Y component values corresponding to sorted blocks in a preset range, and obtaining the first frame of the background-color image of the virtual whiteboard.

As an improvement of the above solution, the image enhancement module includes a first pixel unit and a second pixel unit, where the first pixel unit is configured to extract a background color of each of the frames of the physical whiteboard image based on the virtual whiteboard of each of the frames of the physical whiteboard image, and obtain an initial pixel of each point in each of the frames of the physical whiteboard image; and the second pixel unit is configured to perform color enhancement on the initial pixel of each point in each of the frames of the physical whiteboard image based on a preset pixel activation function.

As an improvement of the above solution, the fusion module includes a motion map unit and a chromatic aberration map unit, where the motion map unit is configured to reduce each frame of the enhanced image to a quarter of a size of an original image, directly obtain a difference between a reduced current frame of the enhanced image of the virtual whiteboard and a reduced previous frame of the enhanced image of the virtual whiteboard, and then perform weighted summation to obtain an absolute value, where a value of a corresponding position of the motion map is increased by 1 when a pixel motion change is greater than a motion threshold, or is cleared when a pixel motion change is not greater than a motion threshold, and a formula is as follows:

$$D_{small}(x) = \begin{cases} D_{small}(x) + 1 &, W_{YUV}|C_{small}(x) - P_{small}(x)| > D_{thresh} \\ 0 &, \text{else} \end{cases}$$

where $C_{small}(x)$ represents a YUV vector of the reduced current frame of the enhanced image of the virtual whiteboard, $P_{small}(x)$ represents a YUV vector of the reduced previous frame of the enhanced image of the virtual whiteboard, $W_{YUV}$ represents a weight of a YUV component, and $D_{thresh}$ represents the motion threshold; and the chromatic aberration map unit is configured to obtain a difference between the reduced current frame of the enhanced image of the virtual whiteboard and a reduced first frame of the background-color image of the virtual whiteboard, and then perform weighted summation to obtain an absolute value, where a value of a corresponding position of the chromatic aberration map is 0 when a chroma change is greater than a chromatic aberration threshold, or 1 when a chroma change is not greater than a chromatic aberration threshold, and a formula is as follows:

$$H_{small}(x) = \begin{cases} 0 &, W'_{YUV}|C_{small}(x) - W_{small}(x)| > H_{thresh} \\ 1 &, \text{else} \end{cases}$$

where $C_{small}(x)$ represent the YUV vector of the reduced current frame of the enhanced image of the virtual whiteboard, $W_{small}(x)$ represents a YUV vector of the reduced first frame of the background-color image of the virtual whiteboard, $W'_{YUV}$ represents a weight of the YUV component, and $H_{thresh}$ represents the chromatic aberration threshold.

As an improvement of the above solution, the perspective module includes a full perspective unit and a semi-perspective unit, where the full perspective unit is configured to perform image fusion by the preset coefficient based on the foreground mask of the current frame of the physical whiteboard image, the current frame of the enhanced image of the virtual whiteboard, and the fully perspective image of the previous frame of the physical whiteboard image, to obtain a current frame of a fully perspective image of a physical whiteboard, where a formula is as follows:

$$B(x) = \begin{cases} A(x), & M(x) = 1 \\ \beta A(x) + (1 - \beta)C(x), & M(x) = 0 \end{cases}$$

where $B(x)$ represents the current frame of the fully perspective image of the physical whiteboard, $A(x)$ represents a previous frame of the fully perspective image of the physical whiteboard, $C(x)$ represents the current frame of the enhanced image of the virtual whiteboard, and $M(x)$ represents the foreground mask of the current frame of the physical whiteboard image; and the semi-perspective unit is configured to perform secondary image fusion by the preset coefficient based on the current frame of the fully perspective image of the physical whiteboard and the current frame of the enhanced image of the virtual whiteboard, to obtain the semi-perspective image of the current frame of the physical whiteboard image, where a formula is as follows:

$$R(x) = \begin{cases} \gamma B(x) + (1 - \gamma)C(x), & M(x) = 1 \\ \delta B(x) + (1 - \delta)C(x), & M(x) = 0 \end{cases}$$

where $B(x)$ represents the current frame of the fully perspective image of the physical whiteboard, $C(x)$ represents the current frame of the enhanced image of the virtual whiteboard, and $R(x)$ represents a current frame of a semi-perspective image of the physical whiteboard.

Correspondingly, the present disclosure further provides a generation apparatus for a virtual whiteboard, including an edge point extraction module, a straight-line extraction module, a combination module, a transformation module, and a physical whiteboard perspective module, where the edge point extraction module is configured to obtain a first frame of a physical whiteboard image, and extract an edge point set of the first frame of the physical whiteboard image;

the straight-line extraction module is configured to map the edge point set onto a first straight-line set based on a preset Hoffman straight-line detection algorithm, and calculate a quantity of intersection point overlapping times of each straight line in the first straight-line set to obtain an effective straight-line set of the first frame of the physical whiteboard image, where a quantity of intersection point overlapping times of a straight line in the effective straight-line set is greater than a filtering threshold;

the combination module is configured to perform combination based on the effective straight-line set of the first frame of the physical whiteboard image to obtain a whiteboard region of the first frame of the physical whiteboard image;

the transformation module is configured to perform homography transformation on the whiteboard region to obtain a virtual whiteboard of the first frame of the physical whiteboard image; and the physical whiteboard perspective module is configured to determine virtual whiteboards of other frames of the physical whiteboard image based on the virtual whiteboard of the first frame of the physical whiteboard image, so as to apply the perspective method for a physical whiteboard in the present disclosure to perform whiteboard perspective on virtual whiteboards of all frames of the physical whiteboard image.

As an improvement of the above solution, the straight-line extraction module includes a first mapping unit, an overlapping unit, and a second mapping unit, where the first mapping unit is configured to construct Hoffman space, and map the edge point set N onto a plurality of straight lines $N_{H1}$, $N_{H2}$, ..., and $N_{Hn}$, where a function expression of each of the straight lines is $\rho = \rho_i \cos(\theta + \varphi_i)$, and $\theta \in [0°, 360°]$, such that the first straight-line set of the first frame of the physical whiteboard image is obtained;

the overlapping unit is configured to calculate intersection point coordinates of the first straight-line set based on a preset overlapping resolution value, and obtain a quantity of overlapping times of each intersection point; and the second mapping unit is configured to: in the first frame of the physical whiteboard image, map an effective intersection point onto an effective straight line in Euler space to obtain the effective straight-line set, where the effective intersection point is an intersection point whose overlapping times are greater than an overlapping threshold.

As an improvement of the above solution, before performing combination to obtain the whiteboard region of the first frame of the physical whiteboard image, the combination module is further configured to: filter a straight line with a small quantity of overlapping times and a wrong angle in the effective straight-line set by a preset filtering algorithm based on a quantity of overlapping times of an overlapping straight line in the effective straight-line set, to obtain a whiteboard straight-line set of the first frame of the physical whiteboard image.

As an improvement of the above solution, the combination module includes a first combination unit and a second combination unit, where the first combination unit is configured to perform combination based on the whiteboard straight-line set to obtain a set of effective quadrilaterals of the first frame of the physical whiteboard image, where the effective quadrilateral is a quadrilateral whose area is larger than a preset area; and the second combination unit is configured to take statistics on a quantity of overlapping times of a quadrilateral in the set of effective quadrilaterals, and select, as the whiteboard region of the first frame of the physical whiteboard image, a region represented by a quadrilateral with most overlapping times.

As an improvement of the above solution, the transformation module includes a first processing unit and a second processing unit, where the first processing unit is configured to calculate four corners of the whiteboard region, and calculate four coordinate points of the whiteboard region based on a camera model and a focal length of a camera; and the second processing unit is configured to perform, in combination with memory optimization and assembly optimization, high-performance homography transformation in YUV space based on the four corners of the whiteboard region and the four coordinate points of the whiteboard region, so as to obtain a virtual whiteboard of each frame of the physical whiteboard image.

Correspondingly, the present disclosure further provides a computer terminal device. The computer terminal device includes a processor, a memory, and a computer program stored in the memory and configured to be executed by the processor, where the processor executes the computer program to implement the perspective method for a physical whiteboard and the generation method for a virtual whiteboard in the present disclosure.

Correspondingly, the present disclosure further provides a computer-readable storage medium. The computer-readable storage medium stores a computer program, and the computer program is run to control a device on which the computer-readable storage medium is located to implement the perspective method for a physical whiteboard and the generation method for a virtual whiteboard in the present disclosure.

DETAILED DESCRIPTION

The technical solutions of the embodiments of the present disclosure are clearly and completely described below with reference to the accompanying drawings in the embodiments of the present disclosure. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

Embodiment 1

Figure 1:
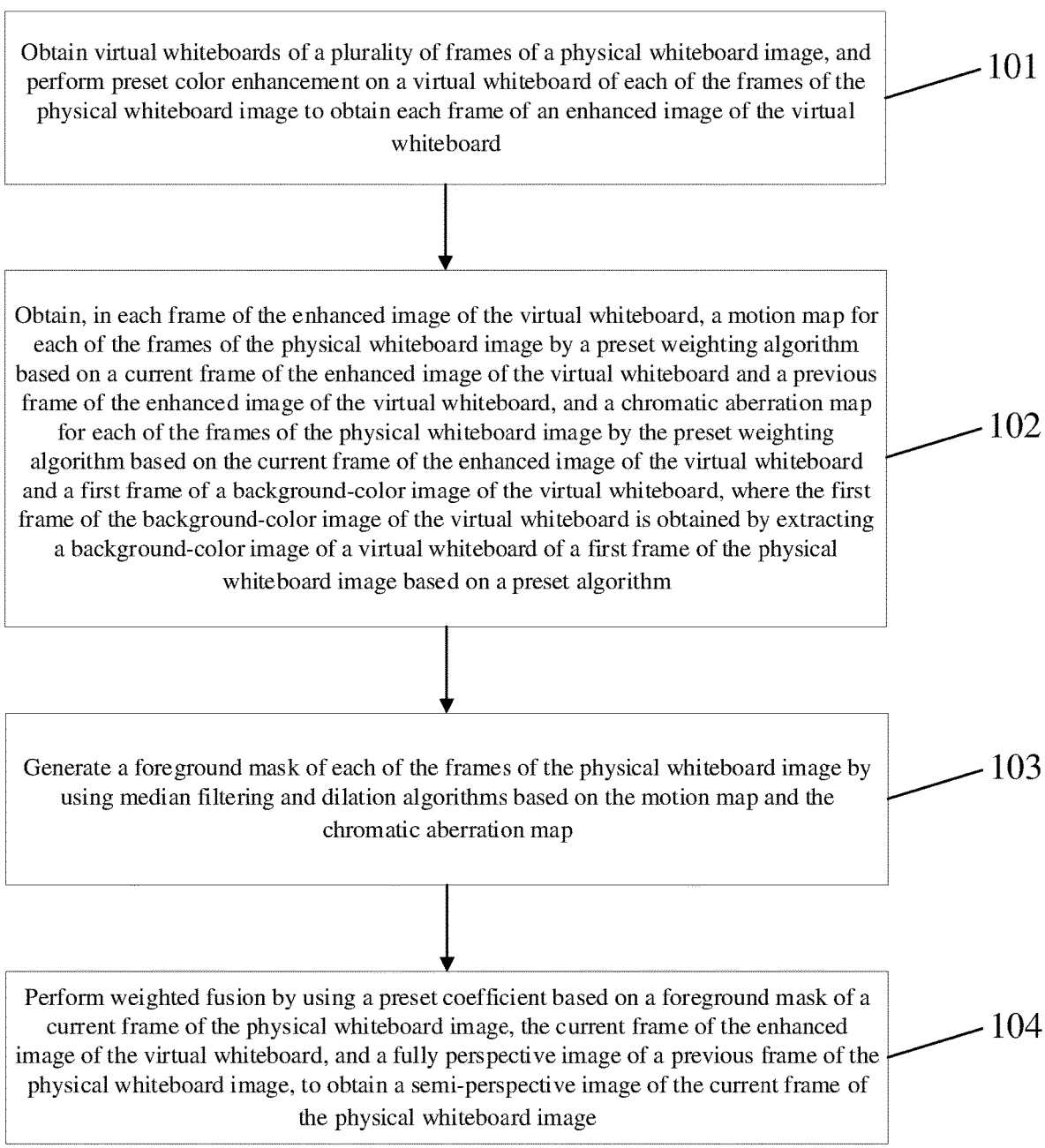
FIG. 1 is a schematic flowchart of a perspective method for a physical whiteboard according to an embodiment of the present disclosure.

FIG. 1 is a schematic flowchart of a perspective method for a physical whiteboard according to an embodiment of the present disclosure. As shown in FIG. 1, this embodiment includes following steps 101 to 104.

Step 101: Obtain virtual whiteboards of a plurality of frames of a physical whiteboard image, and perform preset color enhancement on a virtual whiteboard of each of the frames of the physical whiteboard image to obtain each frame of an enhanced image of the virtual whiteboard.

As an improvement of the above solution, the obtaining virtual whiteboards of a plurality of frames of a physical whiteboard image, and performing preset color enhancement on a virtual whiteboard of each of the frames of the physical whiteboard image to obtain each frame of an enhanced image of the virtual whiteboard specifically includes: extracting a background color of each of the frames of the physical whiteboard image based on the virtual whiteboard of each of the frames of the physical whiteboard image, and obtaining an initial pixel of each point in each of the frames of the physical whiteboard image; and performing color enhancement on the initial pixel of each point in each of the frames of the physical whiteboard image based on a preset pixel activation function.

As an improvement of the above solution, a background color of the virtual whiteboard of each of the frames of the physical whiteboard image can be extracted, a pixel distribution corresponding to the virtual whiteboard can be obtained, and average filtering can be performed for the obtained pixel distribution to obtain the initial pixel of each point.

As an improvement of the above solution, in principle, the preset pixel activation function is to increase a color contrast while ensuring purity of a whiteboard color. A formula is as follows:

$$P_{new} = f(P_{ori}) = \frac{a}{1 + e^{-c(P_{ori} - thresh)}} + b$$

In the above formula, a, b, and c represent adjustable coefficients, and thresh represents an adaptive threshold, which is linear with the background color of the whiteboard. Considering that the whiteboard may have an uneven color due to illumination, if thresh is set to a constant value, a dark region of the whiteboard may become dark, and a color enhancement effect cannot be achieved. Therefore, in the previous step, the background color of the whiteboard is obtained in advance, and an image threshold of each region is obtained. Different activation functions are applied to different pixels on the whiteboard to achieve unified color enhancement. Considering high computational complexity of the activation function, a threshold is stored in advance, and arbitrary pixel mapping $P_{ori} \to P_{new}$ is calculated to facilitate subsequent color enhancement by means of lookup.

Step 102: Obtain, in each frame of the enhanced image of the virtual whiteboard, a motion map for each of the frames of the physical whiteboard image by a preset weighting algorithm based on a current frame of the enhanced image of the virtual whiteboard and a previous frame of the enhanced image of the virtual whiteboard, and a chromatic aberration map for each of the frames of the physical whiteboard image by the preset weighting algorithm based on the current frame of the enhanced image of the virtual whiteboard and a first frame of a background-color image of the virtual whiteboard, where the first frame of the background-color image of the virtual whiteboard is obtained by extracting a background-color image of a virtual whiteboard of a first frame of the physical whiteboard image based on a preset algorithm.

In this embodiment, the step 102 specifically includes: reducing each frame of the enhanced image to a quarter of a size of an original image, directly obtaining a difference between a reduced current frame of the enhanced image of the virtual whiteboard and a reduced previous frame of the enhanced image of the virtual whiteboard, and then perform weighted summation to obtain an absolute value, where a value of a corresponding position of the motion map is increased by 1 when a pixel motion change is greater than a motion threshold, or is cleared when a pixel motion change is not greater than a motion threshold, and a formula is as follows:

$$D_{small}(x) = \begin{cases} D_{small}(x) + 1, & W_{YUV}|C_{small}(x) - P_{small}(x)| > D_{thresh} \\ 0, & \text{else} \end{cases}$$

where $C_{small}(x)$ represents a YUV vector of the reduced current frame of the enhanced image of the virtual whiteboard, $P_{small}(x)$ represents a YUV vector of the reduced previous frame of the enhanced image of the virtual whiteboard, $W_{YUV}$ represents a weight of a YUV component, and $D_{thresh}$ represents the motion threshold; and obtaining a difference between the reduced current frame of the enhanced image of the virtual whiteboard and a reduced first frame of the background-color image of the virtual whiteboard, and then performing weighted summation to obtain an absolute value, where a value of a corresponding position of the chromatic aberration map is 0 when a chroma change is greater than a chromatic aberration threshold, or 1 when a chroma change is not greater than a chromatic aberration threshold, and a formula is as follows:

$$H_{small}(x) = \begin{cases} 0, & W'_{YUV}|C_{small}(x) - W_{small}(x)| > H_{thresh} \\ 1, & \text{else} \end{cases}$$

where $C_{small}(x)$ represent the YUV vector of the reduced current frame of the enhanced image of the virtual whiteboard, $W_{small}(x)$ represents a YUV vector of the reduced first frame of the background-color image of the virtual whiteboard, $W'_{YUV}$ represents a weight of the YUV component, and $H_{thresh}$ represents the chromatic aberration threshold.

As an improvement of the above solution, a specific procedure of obtaining the first frame of the background-color image of the virtual whiteboard is as follows: using a sliding window with a preset size to divide a Y component of the virtual whiteboard of the first frame of the physical whiteboard image into a plurality of blocks based on the virtual whiteboard of each of the frames of the physical whiteboard image; and performing maximum-heap sorting on the blocks, extracting a mean value of Y component values corresponding to sorted blocks in a preset range, and obtaining the first frame of the background-color image of the virtual whiteboard. To better illustrate the improvement solution, a following example is provided for illustration: Resolution of the virtual whiteboard is denoted as 1080 p, and the Y component of the virtual whiteboard is divided based on a step size of 1 by a 16×16 sliding window. The Y component of the virtual whiteboard is divided into 1920× 1080 blocks by the sliding window.

Figure 6:
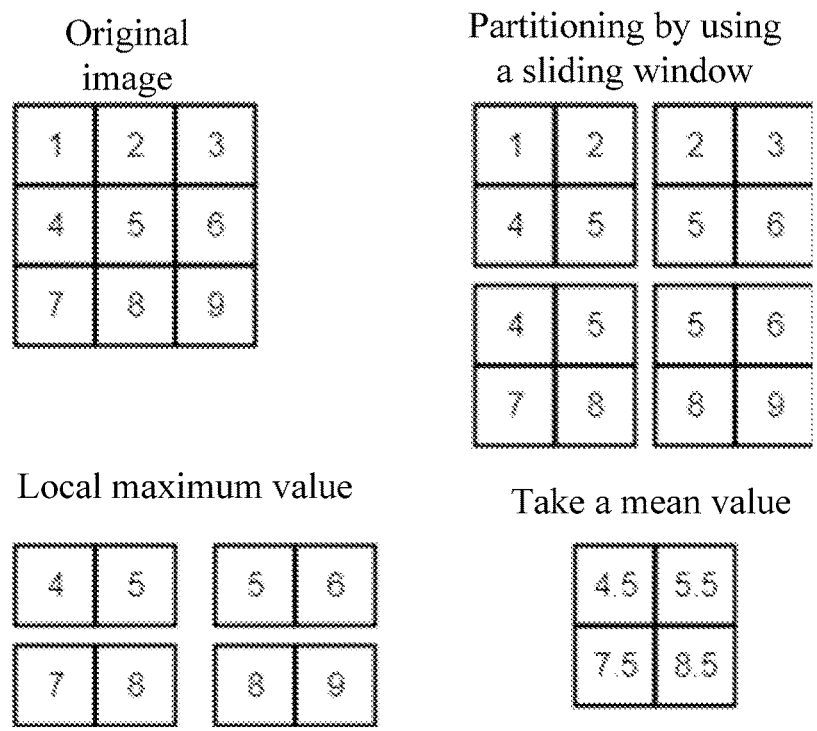
FIG. 6 is a schematic flowchart of extracting a background color of a whiteboard according to an embodiment of the present disclosure.

Each block contains 16×16 pixels. Maximum-heap sorting is performed for each block, the first 10% of largest Y values are extracted, a mean value is taken, and a result after the mean value is taken as the background color of the whiteboard. FIG. 6 is a schematic diagram of extracting the background color of the whiteboard. An original image is divided into blocks by the sliding window, and a local maximum value is calculated, and finally a mean value is taken.

Step 103: Generate a foreground mask of each of the frames of the physical whiteboard image by median filtering and dilation algorithms based on the motion map and the chromatic aberration map.

In this embodiment, specifically, in the step 103, in combination with the chromatic aberration map and the motion map, for a position with the motion map being greater than the threshold and the chromatic aberration map being 1, a value of a position corresponding to a small foreground mask with a resolution of ¼ is 1; otherwise, the value is 0. The median filtering and dilation algorithms are used to process the generated small foreground mask $M_{small}$, and then a processed small foreground mask is scaled to the size M of the original image through nearest neighbor scaling, where a formula is as follows:

$$M_{small}(x) = \begin{cases} 1, & D_{small}(x) > A_{thresh} \text{ and } H_{small}(x) == 1 \\ 0, & \text{else} \end{cases}$$

$$M = \text{Resize}(\text{dilate}(M_{small}))$$

Step 104: Perform weighted fusion by a preset coefficient based on a foreground mask of a current frame of the physical whiteboard image, the current frame of the enhanced image of the virtual whiteboard, and a fully perspective image of a previous frame of the physical whiteboard image, to obtain a semi-perspective image of the current frame of the physical whiteboard image.

As an improvement of the above solution, the performing weighted fusion by a preset coefficient based on a foreground mask of a current frame of the physical whiteboard image, the current frame of the enhanced image of the virtual whiteboard, and a fully perspective image of a previous frame of the physical whiteboard image, to obtain a semi-perspective image of the current frame of the physical whiteboard image specifically includes: performing image fusion by the preset coefficient based on the foreground mask of the current frame of the physical whiteboard image, the current frame of the enhanced image of the virtual whiteboard, and the fully perspective image of the previous frame of the physical whiteboard image, to obtain a current frame of a fully perspective image of a physical whiteboard, where a formula is as follows:

$$B(x) = \begin{cases} A(x), & M(x) = 1 \\ \beta A(x) + (1-\beta)C(x), & M(x) = 0 \end{cases}$$

where B(x) represents the current frame of the fully perspective image of the physical whiteboard, A(x) represents a previous frame of the fully perspective image of the physical whiteboard, C(x) represents the current frame of the enhanced image of the virtual whiteboard, and M(x) represents the foreground mask of the current frame of the physical whiteboard image; and performing secondary image fusion by the preset coefficient based on the current frame of the fully perspective image of the physical whiteboard and the current frame of the enhanced image of the virtual whiteboard, to obtain the semi-perspective image of the current frame of the physical whiteboard image, where a formula is as follows:

$$R(x) = \begin{cases} \gamma B(x) + (1-\gamma)C(x), & M(x) = 1 \\ \delta B(x) + (1-\delta)C(x), & M(x) = 0 \end{cases}$$

where B(x) represents the current frame of the fully perspective image of the physical whiteboard, C(x) represents the current frame of the enhanced image of the virtual whiteboard, and R(x) represents a current frame of a semi-perspective image of the physical whiteboard.

This embodiment performs format processing for the image and stores the threshold of the color enhancement, which not only improves accuracy of the present disclosure, but also reduces an amount of calculation in the process, so as to improve operation efficiency of the present disclosure. In this way, a user achieves a better experience when using the present disclosure. A generation method for a virtual whiteboard and the perspective method for a physical whiteboard reduce a false detection rate of the whiteboard and improve performance of perspective.

Figure 3:
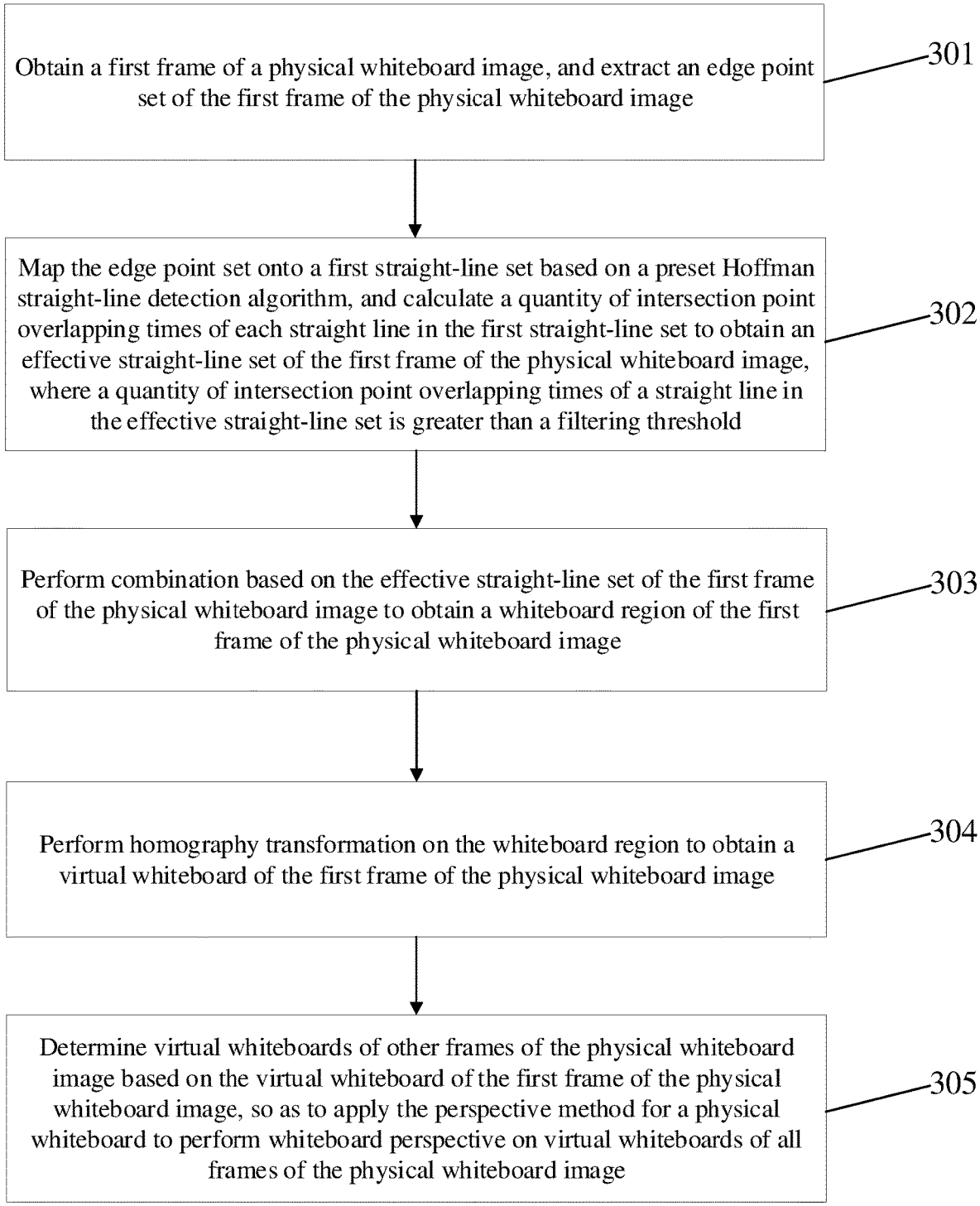
FIG. 3 is a schematic flowchart of a generation method for a virtual whiteboard according to an embodiment of the present disclosure.

FIG. 3 is a schematic flowchart of a generation method for a virtual whiteboard according to an embodiment of the present disclosure. As shown in FIG. 3, this embodiment includes following steps 301 to 305.

Step 301: Obtain a first frame of a physical whiteboard image, and extract an edge point set of the first frame of the physical whiteboard image.

As an improvement of the above solution, the obtaining a first frame of a physical whiteboard image, and extracting an edge point set of the first frame of the physical whiteboard image specifically includes: after collecting a plurality of frames of an original physical whiteboard image by a camera, setting a format for the frames of the original physical whiteboard image to obtain a plurality of frames of a physical whiteboard image; extracting a Y component of each of the frames of the physical whiteboard image as a gray-scale map, performing Gaussian denoising, and extracting gradients of each Y component in x and y directions based on a Sobel operator; and performing weighted fusion and threshold determining on the gradients in the x and y directions separately, and binarizing an obtained result to obtain an edge point set of each of the frames of the physical whiteboard image. It should be noted that a binarized result is used as an edge feature of the image, where 0 represents that this is not a boundary, and 1 represents that this is a boundary.

As an improvement of the above solution, the format of the image collected by the camera is set to YUVI420 to reduce complexity of algorithm processing.

Step 302: Map the edge point set onto a first straight-line set based on a preset Hoffman straight-line detection algorithm, and calculate a quantity of intersection point overlapping times of each straight line in the first straight-line set to obtain an effective straight-line set of the first frame of the physical whiteboard image, where a quantity of intersection point overlapping times of a straight line in the effective straight-line set is greater than a filtering threshold.

As an improvement of the above solution, the mapping the edge point set onto a first straight-line set based on a preset Hoffman straight-line detection algorithm, and calculating a quantity of intersection point overlapping times of each straight line in the first straight-line set to obtain an effective straight-line set of the first frame of the physical whiteboard image specifically includes: constructing Hoffman space, and mapping the edge point set N onto a plurality of straight lines $N_{H1}, N_{H2}, \ldots,$ and $N_{Hn}$, where a function expression of each of the straight lines is $\rho = \rho_i \cos(\theta + \varphi_i)$, and $\theta \in [0°, 360°]$, such that the first straight-line set of the first frame of the physical whiteboard image is obtained; calculating intersection point coordinates of the first straight-line set based on a preset overlapping resolution value, and obtaining a quantity of overlapping times of each intersection point; and in the first frame of the physical whiteboard image, mapping an effective intersection point onto an effective straight line in Euler space to obtain the effective straight-line set, where the effective intersection point is an intersection point whose overlapping times are greater than an overlapping threshold. It should be noted that a set of all straight lines passing through a point in space is represented as a straight line in the Hoffmann space.

As an improvement of the above solution, the preset overlapping resolution value may be set to 3 pixels, in other words, intersection point coordinates within a 3×3 range are considered as a same intersection point.

Step 303: Perform combination based on the effective straight-line set of the first frame of the physical whiteboard image to obtain a whiteboard region of the first frame of the physical whiteboard image.

As an improvement of the above solution, before the performing combination to obtain a whiteboard region of the first frame of the physical whiteboard image, the generation method further includes: filtering a straight line with a small quantity of overlapping times and a wrong angle in the effective straight-line set by a preset filtering algorithm based on a quantity of overlapping times of an overlapping straight line in the effective straight-line set, to obtain a whiteboard straight-line set of the first frame of the physical whiteboard image.

As an improvement of the above solution, the preset filtering algorithm can filter a covered straight line for a non-maximum suppression algorithm based on an angle and a straight-line distance. A straight-line coincidence formula is as follows:

$$\text{line}_{sim} = \alpha(\rho_i - \rho_j) + \beta(\varphi_i - \varphi_j)$$

In the above formula, $\alpha$ and $\beta$ represent weighting coefficients. After the covered straight line is filtered, angle determining is performed to ensure that a right boundary of the whiteboard is $\varphi_{i_{left}} \in [-\text{thresh}_l, \text{thresh}_l)$, an upper boundary of the whiteboard is $\varphi_{i_{left}} \in [90-\text{thresh}_l, 90+\text{thresh}_l)$, and so on, where $\text{thresh}_1$ represents an adaptive threshold.

As an improvement of the above solution, the performing combination to obtain a whiteboard region of the first frame of the physical whiteboard image specifically includes: performing combination based on the whiteboard straight-line set to obtain a set of effective quadrilaterals of the first frame of the physical whiteboard image, where the effective quadrilateral is a quadrilateral whose area is larger than a preset area; and taking statistics on a quantity of overlapping times of a quadrilateral in the set of effective quadrilaterals, and selecting, as the whiteboard region of the first frame of the physical whiteboard image, a region represented by a quadrilateral with most overlapping times. To give a better description, effective straight lines in the whiteboard straight-line set are traversed, $C_n^4$ quadrilaterals M (n represents the effective straight lines) are formed, a quadrilateral with an area lower than $\text{thresh}_m$ is filtered, a quantity of overlapping times $(\Sigma_{i=1}^{4} I_i)$ all effective quadrilaterals are counted, and the region with most overlapping times is selected as the whiteboard region.

Step 304: Perform homography transformation on the whiteboard region to obtain a virtual whiteboard of the first frame of the physical whiteboard image.

As an improvement of the above solution, the performing homography transformation on the whiteboard region to obtain a virtual whiteboard of the first frame of the physical whiteboard image specifically includes: calculating four corners of the whiteboard region, and calculating four coordinate points of the whiteboard region based on a camera model and a focal length of a camera; and performing, in combination with memory optimization and assembly optimization, high-performance homography transformation in YUV space based on the four corners of the whiteboard region and the four coordinate points of the whiteboard region, so as to obtain a virtual whiteboard of each frame of the physical whiteboard image.

Step 305: Determine virtual whiteboards of other frames of the physical whiteboard image based on the virtual whiteboard of the first frame of the physical whiteboard image, so as to apply the perspective method for a physical whiteboard in the present disclosure to perform whiteboard perspective on virtual whiteboards of all frames of the physical whiteboard image. After the virtual whiteboard of the first frame of the physical whiteboard image is determined, a position of the camera keeps unchanged, and the virtual whiteboards of the other frames of the physical whiteboard image can be generated by directly using parameters of the virtual whiteboard of the first frame of the physical whiteboard image. It is not necessary to obtain and output a virtual whiteboard of each frame of the physical whiteboard image.

Figure 5:
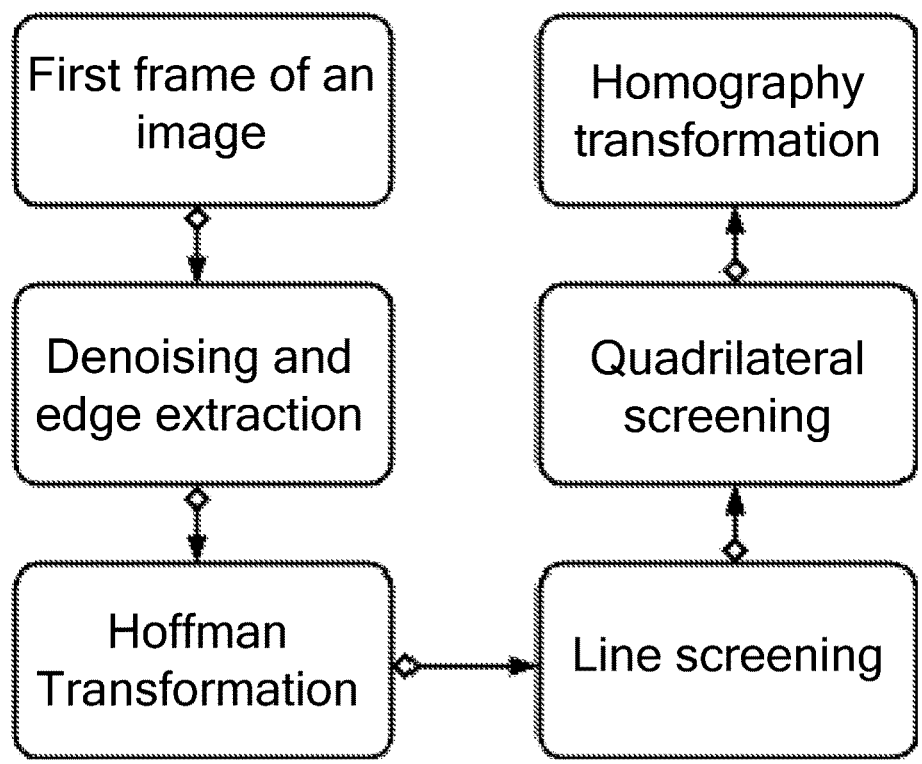
FIG. 5 is a schematic flowchart of a generation method for a virtual whiteboard according to another embodiment of the present disclosure.

FIG. 5 is a schematic flowchart of a generation method for a virtual whiteboard according to another embodiment of the present disclosure.

Embodiment 2

Figure 2:
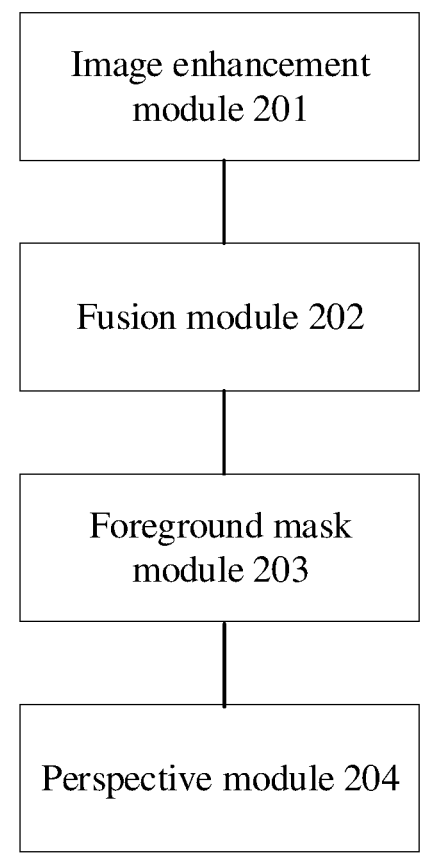
FIG. 2 is a schematic structural diagram of a perspective apparatus for a physical whiteboard according to an embodiment of the present disclosure.

FIG. 2 is a schematic structural diagram of a generation apparatus for a virtual whiteboard according to an embodiment of the present disclosure. The generation apparatus includes an image enhancement module 201, a fusion module 202, a foreground mask module 203, and a perspective module 204.

The image enhancement module 201 is configured to obtain virtual whiteboards of a plurality of frames of a physical whiteboard image, and perform preset color enhancement on a virtual whiteboard of each of the frames of the physical whiteboard image to obtain each frame of an enhanced image of the virtual whiteboard.

The fusion module 202 is configured to obtain, in each frame of the enhanced image of the virtual whiteboard, a motion map for each of the frames of the physical whiteboard image by a preset weighting algorithm based on a current frame of the enhanced image of the virtual whiteboard and a previous frame of the enhanced image of the virtual whiteboard, and a chromatic aberration map for each of the frames of the physical whiteboard image by the preset weighting algorithm based on the current frame of the enhanced image of the virtual whiteboard and a first frame of a background-color image of the virtual whiteboard, where the first frame of the background-color image of the virtual whiteboard is obtained by extracting a background-color image of a virtual whiteboard of a first frame of the physical whiteboard image based on a preset algorithm.

The foreground mask module 203 is configured to generate a foreground mask of each of the frames of the physical whiteboard image by median filtering and dilation algorithms based on the motion map and the chromatic aberration map.

The perspective module 204 is configured to perform weighted fusion by a preset coefficient based on a foreground mask of a current frame of the physical whiteboard image, the current frame of the enhanced image of the virtual whiteboard, and a fully perspective image of a previous frame of the physical whiteboard image, to obtain a semi-perspective image of the current frame of the physical whiteboard image.

As an improvement of the above solution, a specific procedure of obtaining the first frame of the background-color image of the virtual whiteboard is as follows: using a sliding window with a preset size to divide a Y component of the virtual whiteboard of the first frame of the physical whiteboard image into a plurality of blocks based on the virtual whiteboard of each of the frames of the physical whiteboard image; and performing maximum-heap sorting on the blocks, extracting a mean value of Y component values corresponding to sorted blocks in a preset range, and obtaining the first frame of the background-color image of the virtual whiteboard.

As an improvement of the above solution, the image enhancement module 201 includes a first pixel unit and a second pixel unit.

The first pixel unit is configured to extract a background color of each of the frames of the physical whiteboard image based on the virtual whiteboard of each of the frames of the physical whiteboard image, and obtain an initial pixel of each point in each of the frames of the physical whiteboard image.

The second pixel unit is configured to perform color enhancement on the initial pixel of each point in each of the frames of the physical whiteboard image based on a preset pixel activation function.

As an improvement of the above solution, the fusion module 202 includes a motion map unit and a chromatic aberration map unit.

The motion map unit is configured to reduce each frame of the enhanced image to a quarter of a size of an original image, directly obtain a difference between a reduced current frame of the enhanced image of the virtual whiteboard and a reduced previous frame of the enhanced image of the virtual whiteboard, and then perform weighted summation to obtain an absolute value. A value of a corresponding position of the motion map is increased by 1 when a pixel motion change is greater than a motion threshold, or is cleared when a pixel motion change is not greater than a motion threshold, and a formula is as follows:

$$D_{small}(x) = \begin{cases} D_{small}(x) + 1, & W_{YUV}|C_{small}(x) - P_{small}(x)| > D_{thresh} \\ 0, & \text{else} \end{cases}$$

where $C_{small}(x)$ represents a YUV vector of the reduced current frame of the enhanced image of the virtual whiteboard, $P_{small}(x)$ represents a YUV vector of the reduced previous frame of the enhanced image of the virtual whiteboard, $W_{YUV}$ represents a weight of a YUV component, and $D_{thresh}$ represents the motion threshold.

The chromatic aberration map unit is configured to obtain a difference between the reduced current frame of the enhanced image of the virtual whiteboard and a reduced first frame of the background-color image of the virtual whiteboard, and then perform weighted summation to obtain an absolute value, where a value of a corresponding position of the chromatic aberration map is 0 when a chroma change is greater than a chromatic aberration threshold, or 1 when a chroma change is not greater than a chromatic aberration threshold, and a formula is as follows:

$$H_{small}(x) = \begin{cases} 0, & W'_{YUV}|C_{small}(x) - W_{small}(x)| > H_{thresh} \\ 1, & \text{else} \end{cases}$$

where $C_{small}(x)$ represent the YUV vector of the reduced current frame of the enhanced image of the virtual whiteboard, $W_{small}(x)$ represents a YUV vector of the reduced first frame of the background-color image of the virtual whiteboard, $W'_{YUV}$ represents a weight of the YUV component, and $H_{thresh}$ represents the chromatic aberration threshold.

As an improvement of the above solution, the perspective module 204 includes a full perspective unit and a semi-perspective unit.

The full perspective unit is configured to perform image fusion by the preset coefficient based on the foreground mask of the current frame of the physical whiteboard image, the current frame of the enhanced image of the virtual whiteboard, and the fully perspective image of the previous frame of the physical whiteboard image, to obtain a current frame of a fully perspective image of a physical whiteboard, where a formula is as follows:

$$B(x) = \begin{cases} A(x), & M(x) = 1 \\ \beta A(x) + (1 - \beta)C(x), & M(x) = 0 \end{cases}$$

where $B(x)$ represents the current frame of the fully perspective image of the physical whiteboard, $A(x)$ represents a previous frame of the fully perspective image of the physical whiteboard, $C(x)$ represents the current frame of the enhanced image of the virtual whiteboard, and $M(x)$ represents the foreground mask of the current frame of the physical whiteboard image.

The semi-perspective unit is configured to perform secondary image fusion by the preset coefficient based on the current frame of the fully perspective image of the physical whiteboard and the current frame of the enhanced image of the virtual whiteboard, to obtain the semi-perspective image of the current frame of the physical whiteboard image, where a formula is as follows:

$$R(x) = \begin{cases} \gamma B(x) + (1-\gamma)C(x), & M(x) = 1 \\ \delta B(x) + (1-\delta)C(x), & M(x) = 0 \end{cases}$$

where $B(x)$ represents the current frame of the fully perspective image of the physical whiteboard, $C(x)$ represents the current frame of the enhanced image of the virtual whiteboard, and $R(x)$ represents a current frame of a semi-perspective image of the physical whiteboard.

Figure 4:
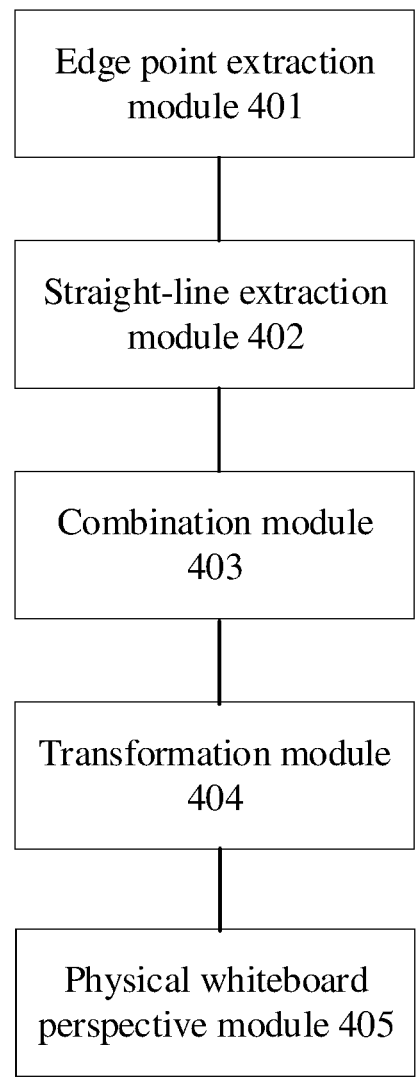
FIG. 4 is a schematic structural diagram of a generation apparatus for a virtual whiteboard according to an embodiment of the present disclosure.

FIG. 4 shows a perspective apparatus for a physical whiteboard according to an embodiment of the present disclosure. The perspective apparatus includes an edge point extraction module 401, a straight-line extraction module 402, a combination module 403, a transformation module 404, and a physical whiteboard perspective module 405.

The edge point extraction module 401 is configured to obtain a first frame of a physical whiteboard image, and extract an edge point set of the first frame of the physical whiteboard image.

The straight-line extraction module 402 is configured to map the edge point set onto a first straight-line set based on a preset Hoffman straight-line detection algorithm, and calculate a quantity of intersection point overlapping times of each straight line in the first straight-line set to obtain an effective straight-line set of the first frame of the physical whiteboard image, where a quantity of intersection point overlapping times of a straight line in the effective straight-line set is greater than a filtering threshold.

The combination module 403 is configured to perform combination based on the effective straight-line set of the first frame of the physical whiteboard image to obtain a whiteboard region of the first frame of the physical whiteboard image.

The transformation module 404 is configured to perform homography transformation on the whiteboard region to obtain a virtual whiteboard of the first frame of the physical whiteboard image.

The physical whiteboard perspective module 405 is configured to determine virtual whiteboards of other frames of the physical whiteboard image based on the virtual whiteboard of the first frame of the physical whiteboard image, so as to apply the perspective method for a physical whiteboard in the present disclosure to perform whiteboard perspective on virtual whiteboards of all frames of the physical whiteboard image.

As an improvement of the above solution, the straight-line extraction module 402 includes a first mapping unit, an overlapping unit, and a second mapping unit.

The first mapping unit is configured to construct Hoffman space, and map the edge point set N onto a plurality of straight lines $N_{H1}, N_{H2}, \ldots,$ and $N_{Hn}$, where a function expression of each of the straight lines is $\rho = \rho_i \cos(\theta + \varphi_i)$, and $\theta \in [0°, 360°]$, such that the first straight-line set of the first frame of the physical whiteboard image is obtained.

The overlapping unit is configured to calculate intersection point coordinates of the first straight-line set based on a preset overlapping resolution value, and obtain a quantity of overlapping times of each intersection point.

The second mapping unit is configured to: in the first frame of the physical whiteboard image, map an effective intersection point onto an effective straight line in Euler space to obtain the effective straight-line set, where the effective intersection point is an intersection point whose overlapping times are greater than an overlapping threshold.

As an improvement of the above solution, before performing combination to obtain the whiteboard region of the first frame of the physical whiteboard image, the combination module is further configured to: filter a straight line with a small quantity of overlapping times and a wrong angle in the effective straight-line set by a preset filtering algorithm based on a quantity of overlapping times of an overlapping straight line in the effective straight-line set, to obtain a whiteboard straight-line set of the first frame of the physical whiteboard image.

As an improvement of the above solution, the combination module 403 includes a first combination unit and a second combination unit.

The first combination unit is configured to perform combination based on the whiteboard straight-line set to obtain a set of effective quadrilaterals of the first frame of the physical whiteboard image, where the effective quadrilateral is a quadrilateral whose area is larger than a preset area.

The second combination unit is configured to take statistics on a quantity of overlapping times of a quadrilateral in the set of effective quadrilaterals, and select, as the whiteboard region of the first frame of the physical whiteboard image, a region represented by a quadrilateral with most overlapping times.

As an improvement of the above solution, the transformation module 404 includes a first processing unit and a second processing unit.

The first processing unit is configured to calculate four corners of the whiteboard region, and calculate four coordinate points of the whiteboard region based on a camera model and a focal length of a camera.

The second processing unit is configured to perform, in combination with memory optimization and assembly optimization, high-performance homography transformation in YUV space based on the four corners of the whiteboard region and the four coordinate points of the whiteboard region, so as to obtain a virtual whiteboard of each frame of the physical whiteboard image.

After extracting the edge point set by the edge point extraction module, the generation apparatus for a virtual whiteboard in this embodiment inputs the edge point set to the straight-line extraction module for straight-line mapping, then combines all straight lines into the whiteboard region by the combination module, and finally converts the whiteboard region into the virtual whiteboard by the transformation module, thereby improving accuracy of extracting the virtual whiteboard. After obtaining virtual whiteboards of all physical whiteboard images by the virtual whiteboard extraction module, the perspective apparatus for a physical whiteboard enhances all the virtual whiteboards by the image enhancement module, fuses the background-color image extracted from the first frame of the physical whiteboard image, the virtual whiteboard of the current frame, and the virtual whiteboard of the previous frame by the fusion module, to calculate the chromatic aberration map and the motion map, generates the foreground mask by the foreground mask module by combining the chromatic aberration map and the motion map, and finally achieves a perspective effect of whiteboard smoothing by the perspective module. This embodiment combines the generation apparatus for a virtual whiteboard and the perspective apparatus for a physical whiteboard to reduce a false detection rate of whiteboard detection and realize a beautiful perspective function.

Embodiment 3

Figure 7:
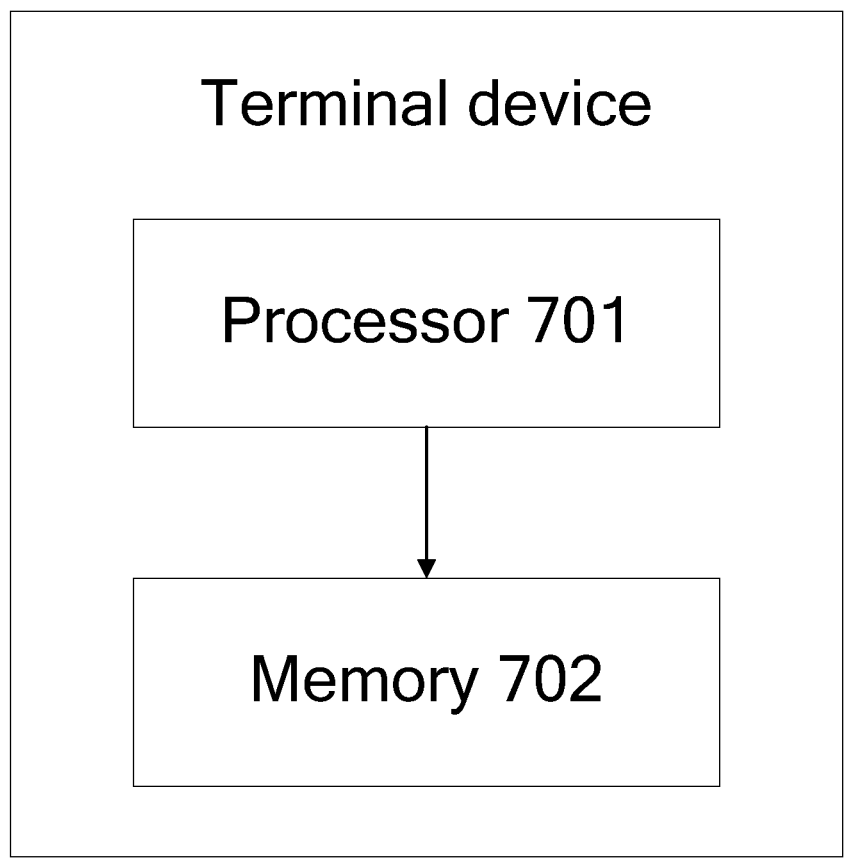
FIG. 7 is a schematic structural diagram of a terminal device according to an embodiment of the present disclosure.

FIG. 7 is a schematic structural diagram of a terminal device according to an embodiment of the present disclosure.

The terminal device in this embodiment includes a processor 701, a memory 702, and a computer program stored in the memory 702 and able to run on the processor 701. The processor 701 executes the computer program to perform the steps of the above-mentioned generation method for a virtual whiteboard and the above-mentioned perspective method for a physical whiteboard in the embodiments, such as all the steps of the perspective method for a physical whiteboard in FIG. 1 or all the steps of the generation method for a virtual whiteboard shown in FIG. 3. Alternatively, the processor executes the computer program to implement functions of the modules in each above-mentioned apparatus embodiment, for example, all modules of the perspective apparatus for a physical whiteboard in FIG. 2, or all modules of the generation apparatus for a virtual whiteboard in FIG. 4.

In addition, the embodiments of the present disclosure further provide a computer-readable storage medium. The computer-readable storage medium stores a computer program, where the computer program is run to control a device on which the computer-readable storage medium is located to implement the generation method for a virtual whiteboard and the perspective method for a physical whiteboard that are described in any one of the above-mentioned embodiments.

Those skilled in the art can understand that the schematic diagram shows only an example of the terminal device, does not constitute a limitation to the terminal device, and may include more or less components than that shown in the figure, a combination of some components, or different components. For example, the terminal device may also include input and output devices, network access devices (NADs), buses, and the like.

The processor 701 may be a central processing unit (CPU), and may also be another general-purpose processor, a digital signal processor (DSP), an application specific integrated circuit (ASIC), a field-programmable gate array (FPGA) or another programmable logic device, a discrete gate, a transistor logic device, a discrete hardware component, or the like. The general-purpose processor may be a microprocessor, or any conventional processor. The processor 701 is a control center of the terminal device, and various parts of the whole terminal device are connected by various interfaces and lines.

The memory 702 may be configured to store the computer program and/or modules. The processor 701 implements various functions of the terminal device by running or executing the computer program and/or modules stored in the memory and invoking data stored in the memory 702. The memory 702 may mainly include a program storage area and a data storage area. The program storage area may store an operating system, an application program required by at least one function (such as a sound playing function and an image playing function), and the like. The data storage area may store data (such as audio data and an address book) created based on use of a mobile phone, and the like. In addition, the memory may include a high-speed random access memory, and may further include a non-volatile memory, such as a hard disk, an internal storage, a plug-in hard disk, a Smart Media Card (SMC), a Secure Digital (SD) card, a Flash Card, at least one magnetic disk storage device, a flash memory device, or another volatile solid-state storage device.

The module or unit integrated in the terminal device, if implemented in a form of a software functional unit and sold or used as a stand-alone product, may be stored in a computer-readable storage medium. Based on such an understanding, all or some of processes for implementing the methods in the foregoing embodiments can be completed by a computer program instructing relevant hardware. The computer program may be stored in a computer-readable storage medium. The computer program is executed by a processor to perform the steps of the foregoing method embodiments. The computer program includes computer program code, and the computer program code may be in a form of source code, a form of object code, an executable file or some intermediate forms, and the like. The computer-readable medium may include: any physical entity or apparatus capable of carrying the computer program code, a recording medium, a USB disk, a mobile hard disk drive, a magnetic disk, an optical disc, a computer memory, a read-only memory (ROM), a random access memory (RAM), an electrical carrier signal, a telecommunications signal, a software distribution medium, and the like.

It should be noted that the apparatus embodiments described above are merely schematic, where the unit described as a separate component may or may not be physically separated, and a component displayed as a unit may or may not be a physical unit, that is, the component may be located at one place, or distributed on a plurality of network units. Some or all of the modules may be selected based on actual needs to achieve the objectives of the solutions of the embodiments. In addition, in the accompanying drawings of the apparatus embodiments provided in the present disclosure, a connection relationship between modules represents a communication connection between the modules, which may be specifically implemented as one or more communication buses or signal lines. Those of ordinary skill in the art can understand and implement the present disclosure without creative effort.

The descriptions above are preferred implementations of the present disclosure. It should be noted that for a person of ordinary skill in the art, various improvements and modifications can be made without departing from the principles of the present disclosure. These improvements and modifications should also be regarded as falling into the protection scope of the present disclosure.

The invention claimed is:

1. A perspective method for a physical whiteboard, comprising:
    obtaining virtual whiteboards of a plurality of frames of a physical whiteboard image, and performing preset color enhancement on a virtual whiteboard of each of the frames of the physical whiteboard image to obtain each frame of an enhanced image of the virtual whiteboard;
    obtaining, in each frame of the enhanced image of the virtual whiteboard, a motion map for each of the frames of the physical whiteboard image by a preset weighting algorithm based on a current frame of the enhanced image of the virtual whiteboard and a previous frame of the enhanced image of the virtual whiteboard, and a chromatic aberration map for each of the frames of the physical whiteboard image by the preset weighting algorithm based on the current frame of the enhanced image of the virtual whiteboard and a first frame of a background-color image of the virtual whiteboard, wherein the first frame of the background-color image of the virtual whiteboard is obtained by extracting a background-color image of a virtual whiteboard of a first frame of the physical whiteboard image based on a preset algorithm;

generating a foreground mask of each of the frames of the physical whiteboard image by median filtering and dilation algorithms based on the motion map and the chromatic aberration map; and performing weighted fusion by a preset coefficient based on a foreground mask of a current frame of the physical whiteboard image, the current frame of the enhanced image of the virtual whiteboard, and a fully perspective image of a previous frame of the physical whiteboard image, to obtain a semi-perspective image of the current frame of the physical whiteboard image.

2. The perspective method for a physical whiteboard according to claim 1, wherein a specific procedure of obtaining the first frame of the background-color image of the virtual whiteboard is as follows:

using a sliding window with a preset size to divide a Y component of the virtual whiteboard of the first frame of the physical whiteboard image into a plurality of blocks based on the virtual whiteboard of each of the frames of the physical whiteboard image; and performing maximum-heap sorting on the blocks, extracting a mean value of Y component values corresponding to sorted blocks in a preset range, and obtaining the first frame of the background-color image of the virtual whiteboard.

3. The perspective method for a physical whiteboard according to claim 2, wherein the obtaining virtual whiteboards of a plurality of frames of a physical whiteboard image, and performing preset color enhancement on a virtual whiteboard of each of the frames of the physical whiteboard image to obtain each frame of an enhanced image of the virtual whiteboard specifically comprises:

extracting a background color of each of the frames of the physical whiteboard image based on the virtual whiteboard of each of the frames of the physical whiteboard image, and obtaining an initial pixel of each point in each of the frames of the physical whiteboard image; and performing color enhancement on the initial pixel of each point in each of the frames of the physical whiteboard image based on a preset pixel activation function to obtain each frame of the enhanced image of the virtual whiteboard.

4. The perspective method for a physical whiteboard according to claim 1, wherein the obtaining, in each frame of the enhanced image of the virtual whiteboard, a motion map for each of the frames of the physical whiteboard image by a preset weighting algorithm based on a current frame of the enhanced image of the virtual whiteboard and a previous frame of the enhanced image of the virtual whiteboard, and a chromatic aberration map for each of the frames of the physical whiteboard image by the preset weighting algorithm based on the current frame of the enhanced image of the virtual whiteboard and a first frame of a background-color image of the virtual whiteboard specifically comprises:

reducing each frame of the enhanced image to a quarter of a size of an original image, directly obtaining a difference between a reduced current frame of the enhanced image of the virtual whiteboard and a reduced previous frame of the enhanced image of the virtual whiteboard, and then performing weighted summation to obtain an absolute value, wherein a value of a corresponding position of the motion map is increased by 1 when a pixel motion change is greater than a motion threshold, or is cleared when a pixel motion change is not greater than a motion threshold, and a formula is as follows:

$$D_{small}(x) = \begin{cases} D_{small}(x) + 1 &, \ W_{YUV}|C_{small}(x) - P_{small}(x)| > D_{thresh} \\ 0 &, \ \text{else} \end{cases}$$

wherein $C_{small}(x)$ represents a YUV vector of the reduced current frame of the enhanced image of the virtual whiteboard, $P_{small}(x)$ represents a YUV vector of the reduced previous frame of the enhanced image of the virtual whiteboard, $W_{YUV}$ represents a weight of a YUV component in the motion map, and $D_{thresh}$ represents the motion threshold; and obtaining a difference between the reduced current frame of the enhanced image of the virtual whiteboard and a reduced first frame of the background-color image of the virtual whiteboard, and then performing weighted summation to obtain an absolute value, wherein a value of a corresponding position of the chromatic aberration map is 0 when a chroma change is greater than a chromatic aberration threshold, or 1 when a chroma change is not greater than a chromatic aberration threshold, and a formula is as follows:

$$H_{small}(x) = \begin{cases} 0 &, \ W'_{YUV}|C_{small}(x) - W_{small}(x)| > H_{thresh} \\ 1 &, \ \text{else} \end{cases}$$

wherein $C_{small}(x)$ represent the YUV vector of the reduced current frame of the enhanced image of the virtual whiteboard, $W_{small}(x)$ represents a YUV vector of the reduced first frame of the background-color image of the virtual whiteboard, $W'_{YUV}$ represents a weight of the YUV component in the chromatic aberration map, and $H_{thresh}$ represents the chromatic aberration threshold.

5. The perspective method for a physical whiteboard according to claim 1, wherein the performing weighted fusion by a preset coefficient based on a foreground mask of a current frame of the physical whiteboard image, the current frame of the enhanced image of the virtual whiteboard, and a fully perspective image of a previous frame of the physical whiteboard image, to obtain a semi-perspective image of the current frame of the physical whiteboard image specifically comprises:

performing image fusion by the preset coefficient based on the foreground mask of the current frame of the physical whiteboard image, the current frame of the enhanced image of the virtual whiteboard, and the fully perspective image of the previous frame of the physical whiteboard image, to obtain a current frame of a fully perspective image of a physical whiteboard, wherein a formula is as follows:

$$B(x) = \begin{cases} A(x), & M(x) = 1 \\ \beta A(x) + (1 - \beta)C(x), & M(x) = 0 \end{cases}$$

wherein B(x) represents the current frame of the fully perspective image of the physical whiteboard, A(x) represents a previous frame of the fully perspective image of the physical whiteboard, C(x) represents the current frame of the enhanced image of the virtual whiteboard, and M(x) represents the foreground mask of the current frame of the physical whiteboard image; and performing secondary image fusion by the preset coefficient based on the current frame of the fully perspective image of the physical whiteboard and the current frame of the enhanced image of the virtual whiteboard, to obtain the semi-perspective image of the current frame of the physical whiteboard image, wherein a formula is as follows:

$$R(x) = \begin{cases} \gamma B(x) + (1-\gamma)C(x), & M(x) = 1 \\ \delta B(x) + (1-\delta)C(x), & M(x) = 0 \end{cases}$$

wherein B(x) represents the current frame of the fully perspective image of the physical whiteboard, C(x) represents the current frame of the enhanced image of the virtual whiteboard, and R(x) represents a current frame of a semi-perspective image of the physical whiteboard.

6. A generation method for a virtual whiteboard, comprising:

obtaining a first frame of a physical whiteboard image, and extracting an edge point set of the first frame of the physical whiteboard image;

mapping the edge point set onto a first straight-line set based on a preset Hoffman straight-line detection algorithm, and calculating a quantity of intersection point overlapping times of each straight line in the first straight-line set to obtain an effective straight-line set of the first frame of the physical whiteboard image, wherein a quantity of intersection point overlapping times of a straight line in the effective straight-line set is greater than a filtering threshold;

performing combination based on the effective straight-line set of the first frame of the physical whiteboard image to obtain a whiteboard region of the first frame of the physical whiteboard image;

performing homography transformation on the whiteboard region to obtain a virtual whiteboard of the first frame of the physical whiteboard image; and determining virtual whiteboards of other frames of the physical whiteboard image based on the virtual whiteboard of the first frame of the physical whiteboard image, so as to apply the perspective method for a physical whiteboard according to claim 1 to perform whiteboard perspective on virtual whiteboards of all frames of the physical whiteboard image.

7. The generation method for a virtual whiteboard according to claim 6, wherein the mapping the edge point set onto a first straight-line set based on a preset Hoffman straight-line detection algorithm, and calculating a quantity of intersection point overlapping times of each straight line in the first straight-line set to obtain an effective straight-line set of the first frame of the physical whiteboard image specifically comprises:

constructing Hoffman space, and mapping the edge point set N onto a plurality of straight lines $N_{H1}, N_{H2}, \ldots,$ and $N_{Hn}$, where a function expression of each of the straight lines is $\rho = \rho_i \cos(\theta + \varphi_i)$, and $\theta \in [0°, 360°]$, such that the first straight-line set of the first frame of the physical whiteboard image is obtained;

calculating intersection point coordinates of the first straight-line set based on a preset overlapping resolution value, and obtaining a quantity of overlapping times of each intersection point; and in the first frame of the physical whiteboard image, mapping an effective intersection point onto an effective straight line in Euler space to obtain the effective straight-line set, wherein the effective intersection point is an intersection point whose overlapping times are greater than an overlapping threshold.

8. The generation method for a virtual whiteboard according to claim 6, wherein before the performing combination to obtain a whiteboard region of the first frame of the physical whiteboard image, the generation method further comprises: filtering a straight line with a small quantity of overlapping times and a wrong angle in the effective straight-line set by a preset filtering algorithm based on a quantity of overlapping times of an overlapping straight line in the effective straight-line set, to obtain a whiteboard straight-line set of the first frame of the physical whiteboard image.

9. The generation method for a virtual whiteboard according to claim 8, wherein the performing combination to obtain a whiteboard region of the first frame of the physical whiteboard image specifically comprises:

performing combination based on the whiteboard straight-line set to obtain a set of effective quadrilaterals of the first frame of the physical whiteboard image, wherein the effective quadrilateral is a quadrilateral whose area is larger than a preset area; and taking statistics on a quantity of overlapping times of a quadrilateral in the set of effective quadrilaterals, and selecting, as the whiteboard region of the first frame of the physical whiteboard image, a region represented by a quadrilateral with most overlapping times.

10. The generation method for a virtual whiteboard according to claim 6, wherein the performing homography transformation on the whiteboard region to obtain a virtual whiteboard of the first frame of the physical whiteboard image specifically comprises:

calculating four corners of the whiteboard region, and calculating four coordinate points of the whiteboard region based on a camera model and a focal length of a camera; and performing, in combination with memory optimization and assembly optimization, high-performance homography transformation in YUV space based on the four corners of the whiteboard region and the four coordinate points of the whiteboard region, so as to obtain a virtual whiteboard of each frame of the physical whiteboard image.

11. A generation method for a virtual whiteboard, comprising:

obtaining a first frame of a physical whiteboard image, and extracting an edge point set of the first frame of the physical whiteboard image;

mapping the edge point set onto a first straight-line set based on a preset Hoffman straight-line detection algorithm, and calculating a quantity of intersection point overlapping times of each straight line in the first straight-line set to obtain an effective straight-line set of the first frame of the physical whiteboard image, wherein a quantity of intersection point overlapping times of a straight line in the effective straight-line set is greater than a filtering threshold;

performing combination based on the effective straight-line set of the first frame of the physical whiteboard image to obtain a whiteboard region of the first frame of the physical whiteboard image;

performing homography transformation on the whiteboard region to obtain a virtual whiteboard of the first frame of the physical whiteboard image; and determining virtual whiteboards of other frames of the physical whiteboard image based on the virtual whiteboard of the first frame of the physical whiteboard image, so as to apply the perspective method for a physical whiteboard according to claim 2 to perform whiteboard perspective on virtual whiteboards of all frames of the physical whiteboard image.

\* \* \* \* \*